US009872068B2

(12) United States Patent
Aubineau et al.

(10) Patent No.: US 9,872,068 B2
(45) Date of Patent: *Jan. 16, 2018

(54) INTERCONNECTING SYSTEM, VIDEO SIGNAL TRANSMITTER AND VIDEO SIGNAL RECEIVER FOR TRANSMITTING AN N-SYMBOL DATA SIGNAL

(71) Applicant: FREESCALE SEMICONDUCTOR, INC., Austin, TX (US)

(72) Inventors: Vincent Aubineau, Areches (FR); Michael Andreas Staudenmaier, Munich (DE); Khaled Terras, Palaiseau (FR)

(73) Assignee: NXP USA, Inc., Austin, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/979,979

(22) Filed: Dec. 28, 2015

(65) Prior Publication Data

US 2017/0026696 A1    Jan. 26, 2017

(30) Foreign Application Priority Data

Jul. 24, 2015    (WO) .................. PCT/IB2015/001536

(51) Int. Cl.
*G06F 11/00* (2006.01)
*H04N 21/4408* (2011.01)
(Continued)

(52) U.S. Cl.
CPC ... *H04N 21/4408* (2013.01); *H04N 21/43632* (2013.01); *H04N 21/42623* (2013.01)

(58) Field of Classification Search
None
See application file for complete search history.

(56) References Cited

U.S. PATENT DOCUMENTS 4,794,604 A * 12/1988 Gorshe .................. H03M 5/18
714/812
5,555,305 A *  9/1996 Robinson ............. H04N 7/1696
348/E7.059

(Continued)

FOREIGN PATENT DOCUMENTS

CN    1749813 A    3/2006
CN    1766698 A    5/2006

OTHER PUBLICATIONS

"Hp and Compaq Flat Panel Monitors—Flat Panel Monitor Displays Message about No Signal, Signal out of Range, Sleep, or Power Save", HP Customer Support, printed from <<http://h10025.www1.hp.com/ewfrf/wc/document?cc=us&lc=en&docname=c00061509>> on Aug. 6, 2015, 8 pages.

(Continued)

*Primary Examiner* — M. Mujtaba Chaudry (57) ABSTRACT

The present application relates to an interconnect system comprising a video signal transmitter and video signal receiver for transmitting a stream of N-symbol data signals over an error prone wired parallel bus having at least N data signal lines. A line scrambler at the video signal transmitter is configured to accept an N-symbol data signal having a sequence of data symbols in a predefined order and to output a permuted sequence of data symbols in accordance with a permutation. The line de-scrambler at the video signal receiver is configured to accept the permuted sequence of data symbols at its input terminal and to restore the predefined order of data symbols from the permuted sequence of data symbols in accordance with the corresponding reverse permutation.

20 Claims, 6 Drawing Sheets

(51) Int. Cl.
*H04N 21/4363* (2011.01)
*H04N 21/426* (2011.01)

(56) References Cited

U.S. PATENT DOCUMENTS

| | | | | |
|---|---|---|---|---|
| 6,111,807 | A * | 8/2000 | Ooishi | G11C 7/22 |
| | | | | 365/189.05 |
| 6,851,086 | B2 * | 2/2005 | Szymanski | H03M 13/09 |
| | | | | 714/781 |
| 7,405,723 | B2 | 7/2008 | Kang et al. | |
| 8,279,216 | B2 | 10/2012 | Hong et al. | |
| 2003/0123389 | A1 * | 7/2003 | Russell | G06F 11/273 |
| | | | | 370/230 |
| 2003/0172336 | A1 * | 9/2003 | Sweeney | H04J 14/02 |
| | | | | 714/758 |

OTHER PUBLICATIONS

U.S. Appl. No. 14/980,073, Inventor Vincent Aubineau, "Interconnecting System, Video Signal Transmitter and Video Signal Receiver for Transmitting an N-Symbol Data Signal", filed Dec. 28, 2015, Office Action—Non-Final Rejection, dated May 8, 2017.

* cited by examiner

INTERCONNECTING SYSTEM, VIDEO SIGNAL TRANSMITTER AND VIDEO SIGNAL RECEIVER FOR TRANSMITTING AN N-SYMBOL DATA SIGNAL

CROSS REFERENCE TO RELATED APPLICATION(S)

The present application claims priority to International Patent Application No. PCT/IB2015/001536, entitled "INTERCONNECTING SYSTEM, VIDEO SIGNAL TRANSMITTER AND VIDEO SIGNAL RECEIVER FOR TRANSMITTING AN N-SYMBOL DATA SIGNAL," filed on Jul. 24, 2015, the entirety of which is herein incorporated by reference.

FIELD OF THE INVENTION

This invention relates to an interconnect system for transmitting a stream of N-bit data signals over an error prone wired connection, a transmitter and a receiver thereof. In particular, the present application relates to an interconnect system for transmitting an image data stream over an error prone wired connection, a transmitter and a receiver thereof.

BACKGROUND

Today's vehicle information displays such as dashboards, display composed graphical information provided by various sources such as vehicle information system, advanced driver assistance systems, navigation systems and consumer entertainment systems. Such composed graphical information includes textual, iconic, pictorial and/or figurative information and comprises both safety relevant graphical information and non-safety relevant graphical information.

Safety relevant graphical information comprises for instance vehicle speed and/or indications relating to state and warning information of the vehicle engine and vehicle components and/or state and warning information of one or more advanced driver assistance systems such as blind spot warnings and distance warnings just to mention a non-limiting selection thereof for the sake of explanation. Non-safety relevant graphical information comprises for instance information generated by entertainment and navigation systems.

Functional safety is a primary issue when displaying safety relevant information to a user controlling an apparatus, to which the safety relevant information relates and the control of which requires an adequate reaction of the user in response to the safety relevant information.

Safety relevant or safety related information represents information, an erroneous content of which might be directly responsible for death, injury or occupational illness, or the erroneous content of which may be the basis for decisions relied on, which might cause death, injury, other significant harms or other significant actions. Safety relevant or safety related information may be the output of safety critical application typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

Image data, on the basis of which the composed graphical information is generated, is transmitted over high-speed connections from various sources to one or more image processing units and further to the displays showing images composed of the image data received from the various sources. Parallel interfaces represent an economic solution to transfer image data between the separate components.

SUMMARY

The present invention provides an interconnect system for transmitting a stream of N-bit data signals over an error prone wired connection, a video signal transmitter and a video signal receiver as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In the automotive field, the presentation of composed visual information provided by several image/video data sources in an integrated graphical user interface such as a car dashboard display replacing the traditional instrument panel or a head-up display is developing rapidly.

The presentation of composed graphical information to a user of a vehicle is used to present non-safety relevant information as well as safety relevant information in a composed image to the user. In case of displaying safety relevant information to a user of a safety critical apparatus such as a vehicle it has to be ensured that the displayed safety relevant information is faultlessly and completely visually perceptible by the user or that the user of the safety critical apparatus is immediately aware about the unreliability of the information displayed to him, e.g. because the displayed information comprises structural, graphical and/or color artifacts visually perceivable by the user.

A source of unreliability is the transmission path of image data between any image data transmitter providing image data as an image data source and image data receiver accepting image data as an image data sink. As exemplified in FIG. 1, image data or image stream data is provided by various sources $20_1$ to $20_n$ through transmission paths $300_1$ to $300_n$ to an image data processing module 10, which e.g. composes the received image data and outputs the resulting composed image data to displaying components 30 such as one or more displays $30_1$ and/or one or more projectors $30_2$ including e.g. one or more head-up displays through transmission paths $300_{n+1}$ to $300_{n+m}$.

Each transmission path 300 is a potential source of error. According to an example of the present application, the image data is transmitted pixel-wise over a transmission path 300 with several parallel data signal lines for carrying image data signals. In particular, the transmission path comprises a number of control signal lines and a number of color signal lines for each color component of a pixel. For instance, a pixel may comprise 8 bits with 3 bits for each of the red and green components and the two remaining bits to the blue component; a pixel may comprise 16 bits with 4 bits for each of the red, green and blue components plus optionally 4 bits for alpha (transparency) or with 5 bits for each of the red, green and blue components plus optionally for 1 bit for alpha; a pixel may comprise 18 bits with 6 bits for each of the red, green and blue components; or a pixel may comprise 24 bits with 8 bits for each of the red, green and blue components. Further color coding of pixels are used. Those skilled in the art will understand from the following description that the present application is not limited to any specific pixel color coding. In particular, those skilled in the art will understand that the present application is applicable for image data transmission over parallel interface, where the color coding of the pixels of the image data is based on a color coding scheme such as red, green and blue (RGB) color space coding; YCbCr (luma or luminance, blue-difference chroma, red-difference chroma) color space coding; cyan, magenta, yellow (CMY) color space coding, cyan, magenta, yellow, black (CMYK) color space coding, hue, saturation, and lightness (HLS) color space coding, hue, saturation, and value (HSV) color space coding; or hue, saturation, and value (HSV) color space coding to mention a non-limiting exemplary selection of color coding schemes.

When using parallel color data signal lines each for carrying for instance a single bit, bi-level signal of the color information of one pixel, a potential source of error is a defective color signal line, which signal level remains at either low or high irrespective of the actual signal level to be transmitted.

Figure 10:
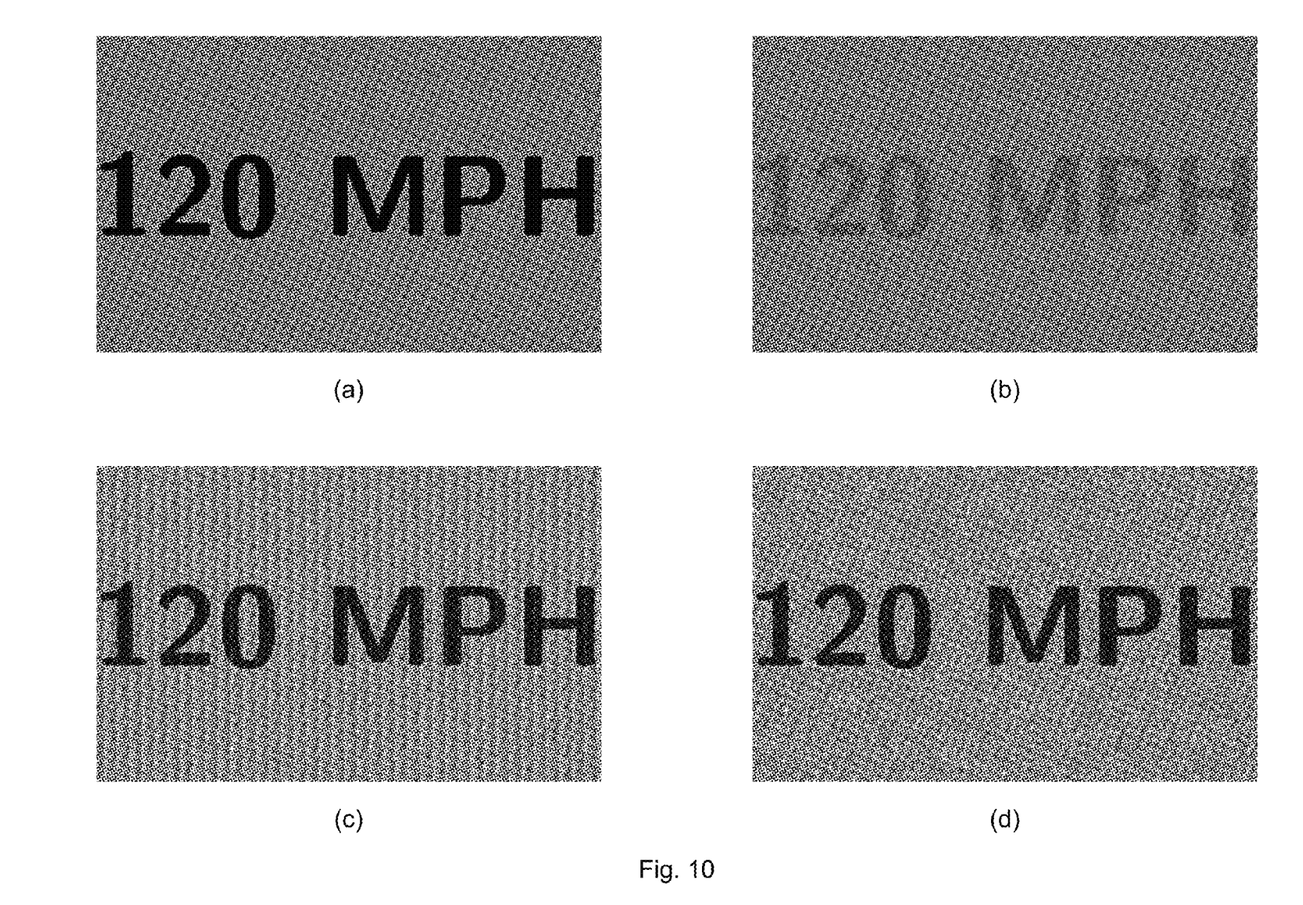
FIG. 10 illustrates exemplary display images according to examples of the present invention.

Referring now to FIG. 10, an image comprising a graphical text information "120 MPH" being substantially black-colored is composed on a substantially single-colored uniform background, e.g. a substantially red-colored background as schematically shown in the black-and-white depiction (a) of FIG. 10. In case one of the color data signal lines is e.g. always at high level the contrast between the substantially uniform, single-colored background and the black-colored graphical text information is significantly reduced when the defective color signal line is connected to carrying the most significant bit of the red component or a bit of high significance thereof as schematically shown in the black-and-white depiction (b) of FIG. 10. The graphical text information intended to be displayed black-colored is displayed in a red tone color due to the defective color data signal line such that the red tone-colored graphical text information on the substantially uniform red-colored background may become substantially indiscernible to the user, at the worst.

A signal terminal assignment of an exemplary data signal interface for transmitting/receiving pixel-wise a stream of image data (video data) is shown in the following table relating to an exemplary state of the art digital 18-bit RGB parallel video interface e.g. to couple an video source to a TFT monitor:

| Designation | Description | Function |
|---|---|---|
| DCLK, CK, Pixel Clock | Data Sampling Clock | Control line Data Sampling Clock Signal (Pixel Clock) |
| HSync, H-Sync | Horizontal Sync signal | Control line Horizontal Sync Signal (e.g. negative going) |
| VSync, V-Sync | Vertical Sync Signal | Control line Vertical Sync Signal (e.g. negative going) |
| R0 (LSB)[2] | Red Data Signal | Data Signal Lines |
| R1 | Red Data Signal | RED color channel |
| R2 | Red Data Signal | with 6 bit width |
| R3 | Red Data Signal | |
| R4 | Red Data Signal | |
| R5 (MSB)[3] | Red Data Signal | |
| GND[1] | Ground | Ground line |
| G0 (LSB)[2] | Green Data Signal | Data Signal Lines |
| G1 | Green Data Signal | GREEN color channel |
| G2 | Green Data Signal | with 6 bit width |
| G3 | Green Data Signal | |
| G4 | Green Data Signal | |
| G5 (MSB)[3] | Green Data Signal | |
| GND[1] | Ground | Ground line |
| B0 (LSB)[2] | Blue Data Signal | Data Signal Lines |
| B1 | Blue Data Signal | BLUE color channel |
| B2 | Blue Data Signal | with 6 bit width |
| B3 | Blue Data Signal | |
| B4 | Blue Data Signal | |
| B5 (MSB)[3] | Blue Data Signal | |
| GND[1] | Ground | Ground line |
| ENAB | Enable | Control line Horizontal Display Position Set Signal Enables LCD |

-continued

| Designation | Description | Function |
|---|---|---|
| R/L (Optional) | Right or Left Scan | Chip Specific |
| U/D (Optional) | Up or Down Scan | Chip Specific |
| V/Q (Optional) | VGA or QVGA | Chip Specific |

[1]E.g. ground lines are placed between various signal lines for isolation. (Only 3 ground lines are shown for the sake of illustration)
[2]LSB: Least significant bit
[3]MSB: Most significant bit Referring now to FIG. 2, a block diagram of a video signal transmitter and a video signal receiver coupled with each other through parallel interfaces and an interconnecting parallel bus according to an example of the present application is schematically illustrated. The video signal transmitter and a video signal receiver form an interconnect system for transmitting a stream of N-symbol data signals, e.g. a steam of pixel-based image data, over an interconnecting parallel bus representing a detachable error prone wired connection between the transmitter-receiver arrangement.

Figure 2:
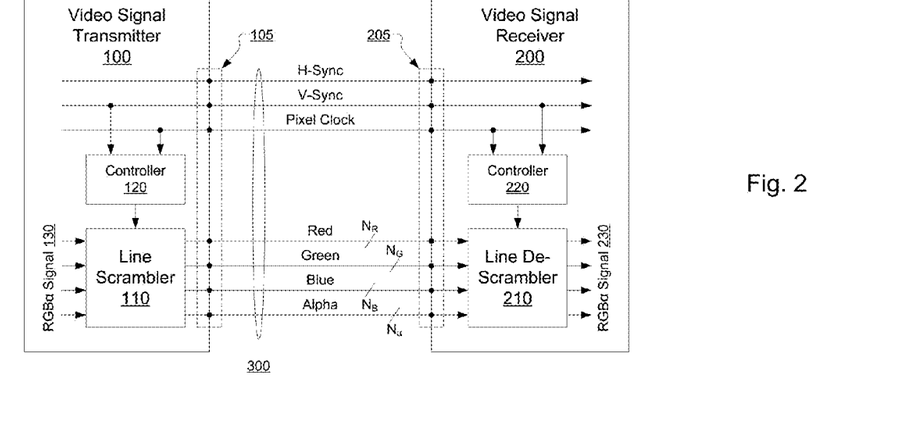
FIG. 2 schematically illustrates a block diagram of an image signal transmission system comprising an image data transmitter and an image data receiver according to an example of the present invention.

The video signal transmitter 100 should be understood as any source, which supplies a stream of image data signal through a parallel interface 105. Such a parallel interface 105 comprises typically one or more control terminals to output one or more control signals and several video/image data terminals to output image data signals in form of digital color signals each having a predefined number of bits or bit width coding one of the color components.

The control signals comprises exemplarily a V-SYNC (Vertical-Sync) or FP signal (Frame Pulse), e.g. used to reset the row pointer to top of a display, H-SYNC (Horizontal-Sync) or LP signal (Line Pulse), e.g. used to reset the column pointer to an edge of a display and/or a pixel clock, e.g. a trigger signal synchronized with the video data signals.

The image data signals outputted by the video signal transmitter 100 comprises a plurality of pixel data. A predefined number of pixels forms a displayable image. Each pixel data is further composed of one or more component data signals such as color data signals for each of e.g. three color components (such as a red data signal, a green data signal and a blue data signal) and a transparency (alpha) data signal. In an exemplary embodiment, the red data signal comprises a number of $N_R$ bits, the green data signal comprises a number of $N_G$ bits, the blue data signal comprises a number of $N_B$ bits and the alpha data signal comprises a number of $N_\alpha$ bits.

The video signal receiver 200 should be understood as any sink/destination, which accepts a stream of image data signals through a parallel interface 205 comprising one or more control terminals and several video/image data terminals to receive the one or more control signals and the image data signals transmitted by the video signal transmitter 100. The video signal transmitter 100 and the video signal receiver 200 are interconnected by a parallel bus 300 comprises at least one line for interconnecting one terminal of the parallel interface 105 of the video signal transmitter 100 with one corresponding terminal of the parallel interface 205 of the video signal receiver 200. In particular, the parallel bus 300 is detachable connected to the parallel interface 105 and the parallel interface 205.

For the sake of understanding, the term "bus" will be used to refer to a plurality of lines and/or conductors, which may be used to transfer one or more various types of information such as a plurality of bi-level signals. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa.

On transmitter side, a line scrambler 110 is interposed in signal flow downstream the parallel interface 105 of the video signal transmitter 100. In particular, the line scrambler 110 is directly coupled downstream to the parallel interface 105 of the video signal transmitter 100. On receiver side, a line de-scrambler 210 is interposed in signal flow upstream the parallel interface 205 of the video signal receiver 200. In particular, the line de-scrambler 210 is directly coupled upstream to the parallel interface 205 of the video signal receiver 200. Further, a controller 120 is further arranged with the line scrambler 110 of the video signal transmitter 100 and a controller 220 is arranged with the line de-scrambler 210 of the video signal receiver 200.

As set forth above with reference to the exemplary state of the art digital 18-bit RGB parallel video interface, the color components of each pixel of image data is asserted in synchronicity with the Data Sampling Clock Signal (Pixel Clock) in a fixed predefined assignment to the terminals of the interface. In the above example, the RGB color components comprises a 6-bit red component, a 6-bit green component and a 6-bit blue component. The least significant bit (LSB) of each 6-bit color component is asserted to a corresponding fixedly predefined first terminal and the further The bits of each 6-bit color component are asserted with increasing significance to corresponding fixedly predefined terminals of the interface stating with the least significant bits (LSB) up to the most significant bits (MSB). The bit data signal of a given significance of a 6-bit color component is always asserted to the same fixedly predefined terminal and hence also transmitted on the same line of the parallel bus 300 intercoupling the terminals of the parallel interfaces 105, 205 of a video signal transmitter 100 and a video signal receiver 200, respectively. It should be noted that, the components comprise e.g. three color components with $N_R$, $N_G$ and $N_B$ bits and an alpha component with $N_\alpha$ bits.

The line scrambler 110 is provided to controllably change the assigning or mapping of the bit significances of an N-bit data signal to N data terminals of the transmitter side parallel interface 105. In an example of the present application, the line scrambler 110 comprises N input terminals $i_1$ to $i_N$, each of which provided for accepting a signal comprising a data bit, and N output terminals $o_1$ to $o_N$, each of which provided for outputting a signal comprising a data bit. The line scrambler 110 is selectively controllable to route each signal at one of the N input terminals $i_1$ to $i_N$ to a different one of the output terminal terminals $o_1$ to $o_N$. In particular, the line scrambler 110 is controllably configurable to establish separate connections between each of the input terminals $i_1$ to $i_N$ and each of the output terminal terminals $o_1$ to $o_N$ without conflict between the signals transmitted at the separately established connections. Accordingly, the line scrambler 110 selectively routes an N-bit input signal to the N output terminals $o_1$ to $o_N$.

The line de-scrambler 210 is provided to controllably restore the received N-bit data signal at N data terminals of the receiver side parallel interface 205 to obtain the original N-bit data signal ordered according to the original bit significances. In an example of the present application, the de-scrambler 210 comprises N input terminals $i'_1$ to $i'_N$, each of which provided for accepting a signal comprising a data bit, and N output terminals $o'_1$ to $o'_N$, each of which provided for outputting a signal comprising a data bit. The line de-scrambler 210 is selectively controllable to route each signal at one of the N input terminals $i'_1$ to $i'_N$ to a different one of the output terminal terminals $o'_1$ to $o'_N$. In particular, the line de-scrambler 210 is controllably configurable to establish separate connections between each of the input terminals $i'_1$ to $i'_N$ and each of the output terminal terminals $o'_1$ to $o'_N$ without conflict between the signals transmitted at the separately established connections. Accordingly, the line scrambler 110 selectively routes an N-bit input signal to the N output terminals $o'_1$ to $o'_N$.

Each of the N output terminals $o_1$ to $o_N$ of the line scrambler 110 is fixedly connected to one of the data signal terminals of the parallel interface 105. The respective data signal terminals of the parallel interface 105 are referred to as data signal terminals $o_1$ to $o_N$ for the sake of description. Each of the N input terminals $i'_1$ to $i'_N$ of the line de-scrambler 210 is fixedly connected to one of the data signal terminals of the parallel interface 205. The respective data signal terminals of the parallel interface 205 are referred to as data signal terminals $i'_1$ to $i'_N$ for the sake of description.

The functionality of the line scrambler 110 and the line de-scrambler 210 will be fully understood on the basis of the following description referring to an exemplary 4-bit data signal.

Figure 3:
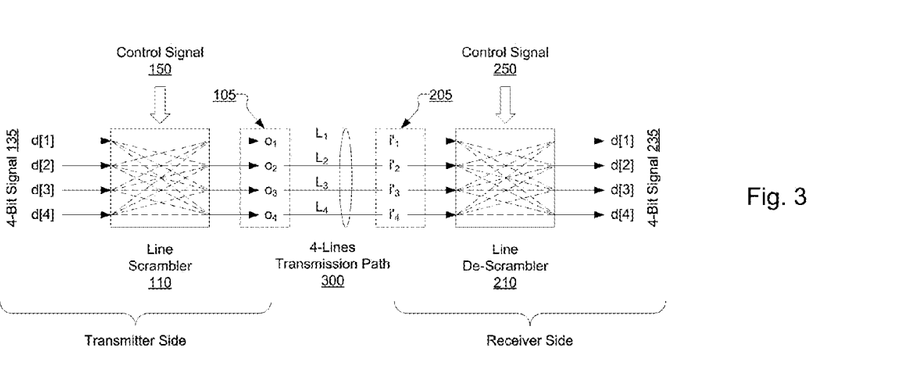
FIG. 3 illustrates a block diagram showing schematically signal line scrambling and de-scrambling according to an example of the present invention.

Referring now to FIG. 3, a block diagram of a line scrambler 110 at transmitter side and a line de-scrambler 210 at receiver side according to an example of the present application is schematically shown. A 4-bit data signal is provided to the line scrambler 110. The 4-bit data signal is to be transmitted through the bus 300 representing a data transmission path with at least 4 data signal lines or conductors, each for carrying a bi-level signal, in particular each for carrying a signal comprising a data bit.

The 4-bit data signal is supplied to the line scrambler 110 in a defined order according to the significances of the each data bit thereof. In particular, each data bit signal of the 4-bit data signal are supplied to the input terminals $i_1$ to $i_4$ of the line scrambler 110. For the sake of explanation only, the bit significances are indexed staring with [1] representing the least significant bit (LSB) to [4] representing the most significant bit (MSB) of the 4-bit data signal.

In the unassigned, unmapped or default case, the bit signal with significance [1], herein e.g. the least significant bit (LSB), is routed by the line scrambler 110 from the input terminal $i_1$ to output terminal $o_1$ of the parallel interface 105 on transmitter side, transmitted over the signal line $L_1$ of the bus 300 to data terminal $i'_1$ of the parallel interface 205 on receiver side and routed by the line de-scrambler 210 from the input terminal to output terminal $o'_1$ thereof. Further, the bit signal with significance [2] is routed by the line scrambler 110 from the input terminal $i_2$ to data terminal $o_2$ of the parallel interface 105 on transmitter side, transmitted through the signal line $L_2$ of the bus 300 to data terminal $i'_2$ of the parallel interface 205 on receiver side and routed by the line de-scrambler 210 from the input terminal $i'_2$ to output terminal $o'_2$ thereof. Furthermore, the bit signal with significance [3] is routed by the line scrambler 110 from the input terminal $i_3$ to data terminal $o_3$ of the parallel interface 105 on transmitter side, transmitted through the signal line $L_3$ of the bus 300 to data terminal $i'_3$ of the parallel interface 205 on receiver side and routed by the line de-scrambler 210 from the input terminal $i'_3$ to output terminal $o'_3$ thereof. And the bit signal with significance [4], herein e.g. the most significant bit (MSB), is routed by the line scrambler 110 from the input terminal $i_4$ to data terminal $o_4$ of the parallel interface 105 on transmitter side, transmitted through the signal line $L_4$ of the bus 300 to data terminal $i'_4$ of the parallel interface 205 on receiver side and routed by the line de-scrambler 210 from the input terminal $i'_4$ to output terminal $o'_4$ thereof.

It should be noted that the data terminal $o_i$ of the parallel interface 105, which corresponds and is coupled to the output terminal $o_i$ of the line scrambler 110, is interconnected to via the data signal line $L_i$ of the bus 300 to the data terminal $i'_i$ of the parallel interface 205, which corresponds and is coupled to the output terminal $i'_i$ of the line de-scrambler 210, where $i=1, \ldots, 4$ and in general $i=1, \ldots, N$.

Based on a control signal 150 output by the controller 120 at transmitter side, each of the bit signals of the 4-bit data signal is selectively routed by the line scrambler 110 to any of the data signal terminals $o_1$ to $o_4$ of the parallel interface 105 on transmitter side, wherein each bit signal is selectively routed to another one of the data signal terminals $o_1$ to $o_4$. With respect to an order of data signal terminals $o_1$ to $o_4$ of the parallel interface 105, the sequence of bit signals thereat is permuted based on a control signal 150 with respect to the 4-bit data signal originally supplied to the line scrambler 110.

On receiver side, the bit signals received at the terminals $i'_1$ to $i'_4$ of the parallel interface 205 is supplied to the line de-scrambler 210, which based on a control signal 250 output by the controller 220 at receiver side restores the original 4-bit data signal in accordance with the bit significances at the output terminals $o'_1$ to $o'_4$ of the line de-scrambler 210.

The selective routing performed by the line scrambler 110 is changed over time, in particular the controller 120 controls the line scrambler 110 to regularly change the selective routing. In an example of the present application, the selective routing performed by the line scrambler 110 is changed in synchronicity with the data sampling clock signal and pixel clock, respectively. For instance, the routing to the output terminals of the line scrambler 110 is changed on each cycle of the data sampling clock signal and pixel clock, respectively.

It should be noted that the functionality of the line scrambler 110 and the line de-scrambler 210 although described with reference to an exemplary 4-bit data signal is not limited thereto. In general, line scrambler 110 and the line de-scrambler 210 are likewise applicable also for a data signal with N bits. It should be further noted that the selective routing of the line scrambler 110 and the line de-scrambler 210 of sequences of N-bit received at N input terminals and output at N output terminals will be described in the following on a functional basis. Exemplary non-limiting implementations of the line scrambler 110 and the line de-scrambler 210 are illustrated in the following with reference to FIGS. 5 and 6.

An N-bit data signal is provided at the input of the line scrambler 110. The N-bit data signal d comprises a sequence of N input bits $d_i$, where $i=1, \ldots, N$; i.e. $d=[d[1], d[2], \ldots, d[N]]=[d_1, d_2, \ldots, d_N]$, where $d[i]=d_i=d$ AND $2^{i-1}$. The bit sequence is predefined by the significance of the respective input bits. The line scrambler 110 may be considered to permute the sequence of the N input bits with respect to the data terminals of the parallel interface 105 on receiver side. In other words, the line scrambler 110 performs a permutation $\pi$ that maps the N-bit data signal referred to as a sequence d of bits into a bit sequence d' of new (permuted) order at the N data terminals of the parallel interface 105.

The permuted data sequence d' can be represented by d'=d·P, where P is an N×N permutation matrix P with a single 1 in each row and column, all other entries being zero. The permuted bit sequence d' is provided at the data terminals of the parallel interface 105 and transmitted over the bus 300 with at least N data signal lines to the data terminals of the parallel interface 205 on receiver side.

Every permutation $\pi$ has a corresponding reverse permutation $\pi^{-1}$ that acts on the permuted bit sequence and restores it to its original order. The reverse permutation matrix can be represented simply by transposing of the permutation matrix $P^T$. Hence, $d=d'\cdot P^T$ $(=d\cdot P\cdot P^T=d\cdot I_N)$, where $I_N$ is the N×N identity matrix).

Figure 4:
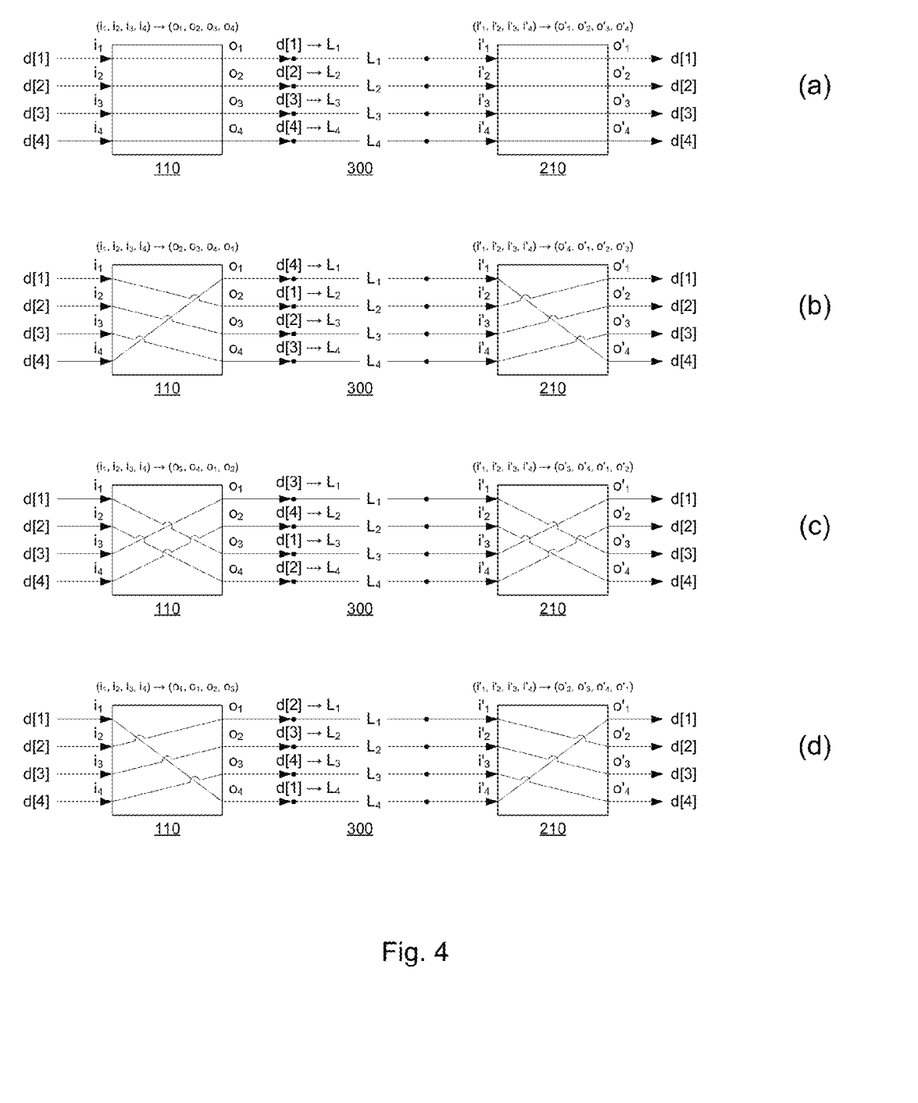
FIG. 4 illustrates block diagrams showing schematically bit rotation scrambling and de-scrambling (cyclic shifting) according to an example of the present invention.

The controllable assigning or mapping and controllable restoring performed by the line scrambler 110 and the line de-scrambler 210 will be further exemplarily described with reference to FIG. 4, which schematically illustrates a cyclic shifting scheme of the individual data bit of a 4-bit data signal with respect to the at least 4 (bi-level) signal lines $L_1$ to $L_4$ of the bus 300.

Without limiting the example thereto, in a first cycle of the cyclic shifting scheme schematically illustrated in FIG. 4(a), a sequence of N data bits $d=[d_1, d_2, \ldots, d_N]$, which is the exemplary 4-bit data signal in original order in accordance with the bit significances, is supplied to the input terminals $i_1$ to $i_4$ of the line scrambler 110:

$$(d_1\ d_2\ d_3\ d_4) \rightarrow (i_1\ i_2\ i_3\ i_4)$$

In the first cycle, the line scrambler 110 outputs a shifted sequence d' cyclic shifted by zero data bits at the output terminals $o_1$ to $o_4$ thereof in accordance with a permutation matrix $P_0$ (which is a 4×4 identity matrix $I_4$):

$$d' = d \cdot P_0$$
$$= (d_1\ d_2\ d_3\ d_4) \cdot \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$
$$= (d_1\ d_2\ d_3\ d_4) \rightarrow (o_1\ o_2\ o_3\ o_4)$$

The shifted sequence d' (cyclic shifted by zero data bits) is transmitted over the bus 300, the data signal lines $L_1$ to $L_4$ of which interconnect the output terminals $o_1$ to $o_4$ of the line scrambler 110 with the respective input terminals to $i'_4$ of the line de-scrambler 210 via the data terminals $o_1$ to $o_4$ and to $i'_4$ of the parallel interfaces 105 and 205. Hence, at the input terminals $i'_1$ to $i'_4$ of the line de-scrambler 210, the shifted sequence d' (cyclic shifted by zero data bits) is received:

$$d'=(d_1\ d_2\ d_3\ d_4) \rightarrow (i'_1\ i'_2\ i'_3\ i'_4)$$

The line de-scrambler 210 restores and outputs the restored original sequence d at the output terminals $o'_1$ to $o'_4$ thereof by inverse cyclic shifting the shifted sequence d' by zero data bits in accordance with the corresponding reverse permutation matrix $P_0^T$:

$$d' \cdot P_0^T = (d_1\ d_2\ d_3\ d_4) \cdot \begin{pmatrix} 1 & 0 & 0 & 0 \\ 0 & 1 & 0 & 0 \\ 0 & 0 & 1 & 0 \\ 0 & 0 & 0 & 1 \end{pmatrix}^T$$
$$= (d_1\ d_2\ d_3\ d_4) \cdot \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$
$$= (d_1\ d_2\ d_3\ d_4) \rightarrow (o'_1\ o'_2\ o'_3\ o'_4)$$

In a second cycle of the cyclic shifting scheme schematically illustrated in FIG. 4(d), the sequence of N=4 data bits $d=[d_1, d_2, d_3, d_4]$ is supplied to the input terminals $i_1$ to $i_4$ of the line scrambler 110:

$$(d_2\ d_3\ d_4) \rightarrow (i_1\ i_2\ i_3\ i_4)$$

In the second cycle, the line scrambler 110 outputs a shifted sequence d' cyclic shifted by one data bit at the output terminals $o_1$ to $o_4$ thereof in accordance with a permutation matrix $P_1$:

$$d' = d \cdot P_1$$
$$= (d_1\ d_2\ d_3\ d_4) \cdot \begin{pmatrix} 0 & 1 & 0 & 0 \\ 0 & 0 & 1 & 0 \\ 0 & 0 & 0 & 1 \\ 1 & 0 & 0 & 0 \end{pmatrix}$$
$$= (d_4\ d_1\ d_2\ d_3) \rightarrow (o_1\ o_2\ o_3\ o_4)$$

The shifted sequence d' (cyclic shifted by one data bit) is in turn transmitted over the bus 300. Hence, at the input terminals $i'_1$ to $i'_4$ of the line de-scrambler 210, the shifted sequence d' (cyclic shifted by one data bit) is received:

$$d'=(d_4\ d_1\ d_2\ d_3) \rightarrow (i'_1\ i'_2\ i'_3\ i'_4)$$

The line de-scrambler 210 restores and outputs the restored original sequence d at the output terminals $o'_1$ to $o'_4$ thereof by inverse cyclic shifting the shifted sequence d' by one data bit in accordance with the corresponding reverse permutation matrix $P_1^T$:

$$d' \cdot P_1^T = (d_4\ d_1\ d_2\ d_3) \cdot \begin{pmatrix} 0 & 1 & 0 & 0 \\ 0 & 0 & 1 & 0 \\ 0 & 0 & 0 & 1 \\ 1 & 0 & 0 & 0 \end{pmatrix}^T$$
$$= (d_4\ d_1\ d_2\ d_3) \cdot \begin{pmatrix} 0 & 0 & 0 & 1 \\ 1 & 0 & 0 & 0 \\ 0 & 1 & 0 & 0 \\ 0 & 0 & 1 & 0 \end{pmatrix}$$
$$= (d_1\ d_2\ d_3\ d_4) \rightarrow (o'_1\ o'_2\ o'_3\ o'_4)$$

In a third cycle of the cyclic shifting scheme schematically illustrated in FIG. 4(c), the sequence of N=4 data bits $d=[d_1, d_2, d_3, d_4]$ is supplied to the input terminals $i_1$ to $i_4$ of the line scrambler 110:

$$(d_1\ d_2\ d_3\ d_4) \rightarrow (i_1\ i_2\ i_3\ i_4)$$

In the third cycle, the line scrambler 110 outputs a shifted sequence d' cyclic shifted by two data bits at the output terminals $o_1$ to $o_4$ thereof in accordance with a permutation matrix $P_2$:

$$d' = d \cdot P_2$$

$$= (d_1 \quad d_2 \quad d_3 \quad d_4) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}$$

$$= (d_3 \quad d_4 \quad d_1 \quad d_2) \rightarrow (o_1 \quad o_2 \quad o_3 \quad o_4)$$

The shifted sequence d' (cyclic shifted by two data bits) is in turn transmitted over the bus 300. Hence, at the input terminals $i'_1$ to $i'_4$ of the line de-scrambler 210, the shifted sequence d' (cyclic shifted by two data bits) is received:

$$d'=(d_3 \, d_4 \, d_1 \, d_2) \rightarrow (i'_1 \, i'_2 \, i'_3 \, i'_4)$$

The line de-scrambler 210 restores and outputs the restored original sequence d at the output terminals $o'_i$ to $o'_4$ thereof by inverse cyclic shifting the shifted sequence d' by two data bits in accordance with the corresponding reverse permutation matrix $P_2^T$:

$$d' \cdot P_2^T = (d_3 \quad d_4 \quad d_1 \quad d_2) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}^T$$

$$= (d_3 \quad d_4 \quad d_1 \quad d_2) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}$$

$$= (d_1 \quad d_2 \quad d_3 \quad d_4) \rightarrow (o'_1 \quad o'_2 \quad o'_3 \quad o'_4)$$

In a fourth cycle of the cyclic shifting scheme schematically illustrated in FIG. 4(d), the sequence of N=4 data bits $d=[d_1, d_2, d_3, d_4]$ is supplied to the input terminals $i_1$ to $i_4$ of the line scrambler 110:

$$(d_1 \, d_2 \, d_3 \, d_4) \rightarrow (i_1 \, i_2 \, i_3 \, i_4)$$

In the fourth cycle, the line scrambler 110 outputs a shifted sequence d' cyclic shifted by three data bits at the output terminals $o_1$ to $o_4$ thereof in accordance with a permutation matrix $P_3$:

$$d' = d \cdot P_3$$

$$= (d_1 \quad d_2 \quad d_3 \quad d_4) \cdot \begin{pmatrix} 0 & 0 & 0 & 1 \\ 1 & 0 & 0 & 0 \\ 0 & 1 & 0 & 0 \\ 0 & 0 & 1 & 0 \end{pmatrix}$$

$$= (d_2 \quad d_3 \quad d_4 \quad d_1) \rightarrow (o_1 \quad o_2 \quad o_3 \quad o_4)$$

The shifted sequence d' (cyclic shifted by three data bits) is transmitted over the bus 300. Hence, at the input terminals $i'_1$ to $i'_4$ of the line de-scrambler 210, the shifted sequence d' (cyclic shifted by three data bits) is received:

$$d'=(d_2 \, d_3 \, d_4 \, d_1) \rightarrow (i'_1 \, i'_2 \, i'_3 \, i'_4)$$

The line de-scrambler 210 restores and outputs the restored original sequence d at the output terminals $o'_i$ to $o'_4$ thereof by inverse cyclic shifting the shifted sequence d' by three data bits in accordance with the corresponding reverse permutation matrix $P_3^T$:

$$d' \cdot P_3^T = (d_4 \quad d_1 \quad d_2 \quad d_3) \cdot \begin{pmatrix} 0 & 0 & 0 & 1 \\ 1 & 0 & 0 & 0 \\ 0 & 1 & 0 & 0 \\ 0 & 0 & 1 & 0 \end{pmatrix}^T$$

$$= (d_2 \quad d_3 \quad d_4 \quad d_1) \cdot \begin{pmatrix} 0 & 1 & 0 & 0 \\ 0 & 0 & 1 & 0 \\ 0 & 0 & 0 & 1 \\ 1 & 0 & 0 & 0 \end{pmatrix}$$

$$= (d_1 \quad d_2 \quad d_3 \quad d_4) \rightarrow (o'_1 \quad o'_2 \quad o'_3 \quad o'_4)$$

After the exemplary four cycles, the scheme of cyclic shifting and restoring of the bit sequence may proceed with repeating the cycles of cyclic shifting scheme. The cyclic shifting scheme may start at anyone of the cycles and/or the cycles of the cyclic shifting scheme may be performed in reverse order. For instance, the cyclic shifting scheme may start with the fourth cycle illustrated in FIG. 4(d), continue with the third cycle illustrated in FIG. 4(c), the second cycle illustrated in FIG. 4(b) and the first cycle illustrated in FIG. 4(a) and further repeat the cycles of the cyclic shifting scheme proceeding with the fourth cycle.

It is noted that the above exemplified cyclic shifting scheme of a 4-bit sequence is analogously applicable to an N-bit data signal, in which case the cyclic shifting scheme comprises N cycles before repeating the cycles of the cyclic shifting scheme. For the above illustrative example, those skilled in the art will further appreciate that the cyclic shifting scheme can be considered as a sequence of predefined permutations $P_0$ to $P_{N-1}$ and the corresponding predefined reverse permutations $P_0^T$ to $P_{N-1}^T$. The cycles of the cyclic shifting scheme may be advanced for every next N-bit data signal, e.g. the cycles of the cyclic shifting scheme may be advanced in synchronicity with the a data sampling clock.

Figure 1:
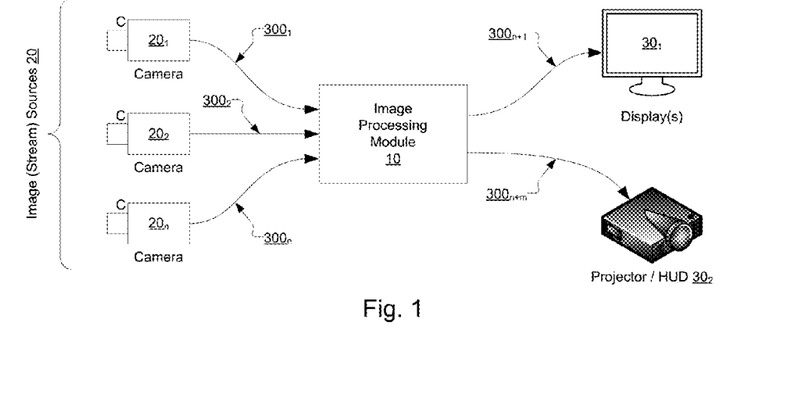
FIG. 1 schematically illustrates a block diagram of an exemplary automotive image processing system an according to an example of the present invention.

Referring now back to the example of an image data transmission described above with reference to the examples shown in FIGS. 1 and 2, those skilled in the art will immediately appreciate that in case of a defective data signal line of the bus 300 a regular pattern will be perceived by a user as illustrated in depiction (c) of FIG. 10 when applying the cyclic shifting scheme separately to each N-bit component and advancing the cycles of the cyclic shifting scheme in synchronicity with the pixel clock. Further, the cyclic shifting scheme may be occasionally or regularly reset and/or restarted, which means that the cyclic shifting scheme is restarted with a predefined cycle thereof e.g. in response to a signal triggering the reset/restart. For instance, the cyclic shifting scheme may be regularly restarted in accordance with at least one of the H-Sync and V-Sync signal.

Figure 5:
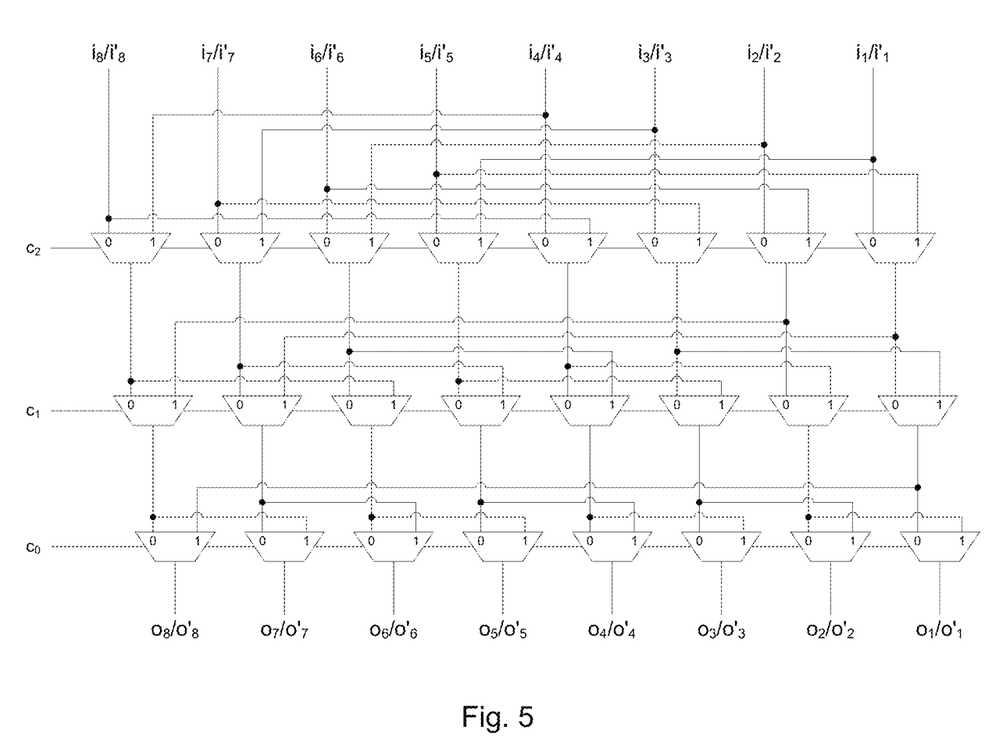
FIG. 5 shows a schematic block diagram of an exemplary right rotating barrel shifter implementable in a line scrambler and a line de-scrambler according to an example of the present invention.

Referring now to FIG. 5, the above illustrated cyclic shifting scheme may be implemented on the basis of barrel shifters in both the line scrambler 110 and line de-scrambler 120. Such barrel shifter allows for cyclic shifting a sequence of bits by a specified number of bits in one clock cycle such that any cyclic combination of the sequence of bits can be generated. The implementation of barrel shifters is within the ordinary skills of the skilled person and hence a detailed description thereof is omitted herein. FIG. 5 schematically illustrates a block diagram of an exemplary implementation of an 8-bit right rotating Barrel shifter with eight input terminals $i_1/i'_1$ to $i_8/i'_8$ and eight output terminals $o_1/o'_1$ to $o_8/o'_8$. The illustrated right rotating Barrel shifter uses three stages with 4-bit, 2-bit and 1-bit rotates. Accordingly, the illustrated rotating Barrel shifter has three control input terminals $c_0$ to $c_2$ for inputting the number of bits, about which the 8-bit input data signal is to be rotated. It should be noted that N-bit right and left rotating Barrel shifters are known in the art.

Further implementation examples of the line scrambler 110 and line de-scrambler 120 are schematically shown in the following FIGS. 5 and 6 and will be briefly described in the following The line scrambler 110 and line de-scrambler 120 may each comprise an N×N crossbar switch with N source nodes/input terminals and N destination nodes/output terminals. Every input terminal is selectively connectable to every output terminal. Signals applied to the input terminals are simultaneously routed to the respective selected output terminals without conflicts Hence, N controllably selective separate connections are established each from a different one of the N input terminals to a different one of the N output terminals.

Figure 6:
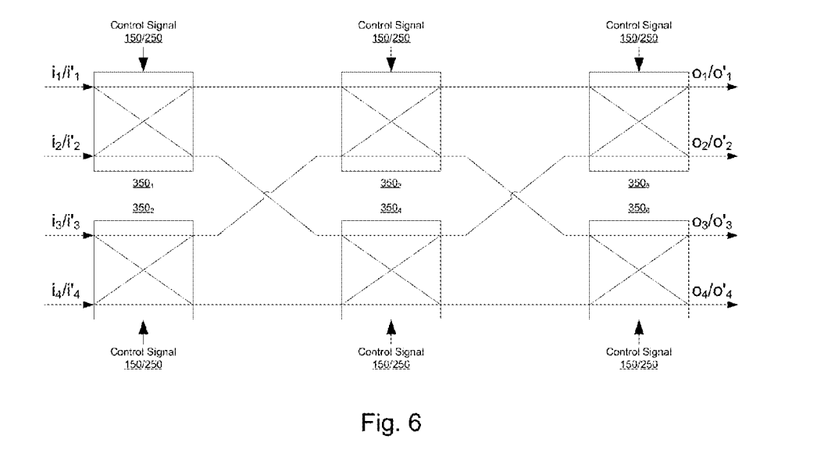
FIG. 6 shows a schematic block diagram of an exemplary switching network implementable in a line scrambler and a line de-scrambler according to an example of the present invention.

Another type of non-blocking interconnect topology, which enables simultaneous transmission of data signals from every input terminal to every output terminal without conflicts is shown in FIG. 6, which schematically illustrates a block diagram of an exemplary 4×4 Benes network or 4×4 Benes switch. The Benes network is constructed with 2×2 crossbar switches and is in particular re-arrangeably non-blocking. A network may be understood as re-arrangeably non-blocking if once the permutation from input terminals to output terminals is known, the network can then be rearranged to provide all connections specified by the permutation without conflicts.

The exemplary 4×4 Benes network shown herein for the sake of explanation comprises four input terminals $i_1/i'_1$ to $i_4/i'_4$, six 2×2 crossbar switches $350_1$ to $350_6$ and four output terminals $o_1/o'_1$ to $o_4/o'_4$. The crossbar switches $350_1$ to $350_6$ are controlled by the controller 150 and the controller 250, respectively, to route the input signals at every input terminal $i_1/i'_1$ to $i_4/i'_4$ to every respective output terminal $o_i/o'_1$ to $o_4/o'_4$ in accordance with any permutation and reverse permutation, respectively.

The exemplary 4×4 Benes network of FIG. 6 may be implemented in the line scrambler 110 and line de-scrambler 210 described above.

It should be noted that the non-blocking interconnect topology is generally known to those skilled in the art as banyan networks, which are defined to be multi-stage networks that have exactly one signal path from any input terminal to any output terminal. Multi-stage logarithmic networks are a subset of banyan networks that are typically constructed using 2×2 crossbar switches. The above exemplified Benes network is one example of multi-stage logarithmic networks, which further for instance include the Omega network and the Butterfly network. The Omega network and the Butterfly network are delta networks, a subset of banyan networks that are self-routing.

Figure 7:
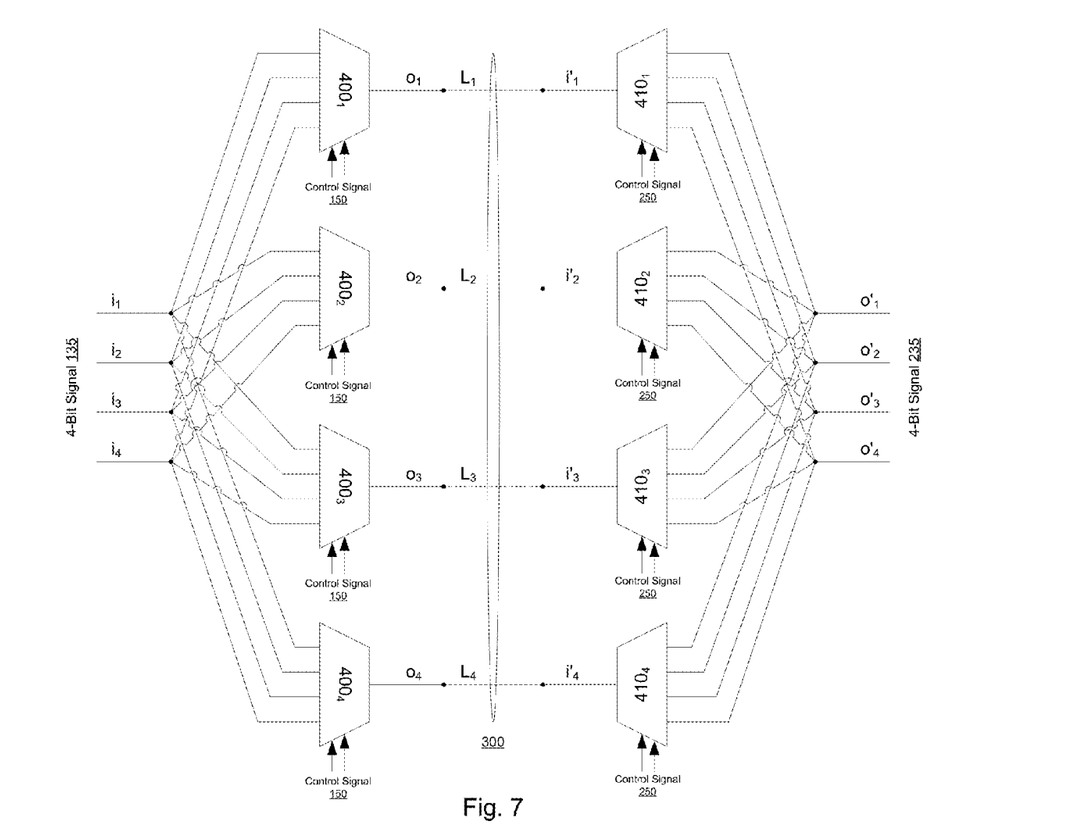
FIG. 7 shows a schematic block diagram of exemplary multiplexer arrangements implementable in a line scrambler and a line de-scrambler according to another example of the present invention.

Referring now to FIG. 7, a schematic block diagram of further implementation examples of the line scrambler 110 and line de-scrambler 120 is shown.

The example line scrambler 110 comprises four 4×1 multiplexers (MUXs), which are selectively switched under control of the controller 120. The four 4×1 multiplexers (MUXs) enable to route data signals at every input terminal $i_1$ to $i_4$ to every output terminal $o_1$ to $o_4$ without conflicts. Analogously, the example line de-scrambler 210 comprises four 1×4 multiplexers (MUXs), which are selectively switched under control of the controller 220. The four 1×4 multiplexers (MUXs) enable to route data signal at every input terminal $i'_1$ to $i'_4$ to every output terminal $o'_1$ to $o'_4$ without conflicts. Hence, a line scrambler 110 and a line de-scrambler 210 implemented on the basis multiplexers as exemplified in FIG. 7 likewise enable to route the input signals at every input terminal $i_1/i'_1$ to $i_4/i'_4$ to every respective output terminal $o_1/o'_1$ to $o_4/o'_4$ in accordance with any permutation and reverse permutation, respectively.

Those skilled in the art will immediately understand that a more general implementation of a line scrambler 110 may comprise N N×1 multiplexers for accepting an N-bit data signal and outputting a permuted sequence of N data bits and a line de-scrambler 210 may comprise N 1×N multiplexers for accepting the permuted sequence of N data bits and outputting the restored N-bit data signal.

Those skilled in the art understand that the above implementations are merely exemplary but not limiting. Alternative implementations may be used for the line scrambler 110 and line de-scrambler 210 enabling the same functionality as described above with reference to the various exemplary implementations.

Figure 8:
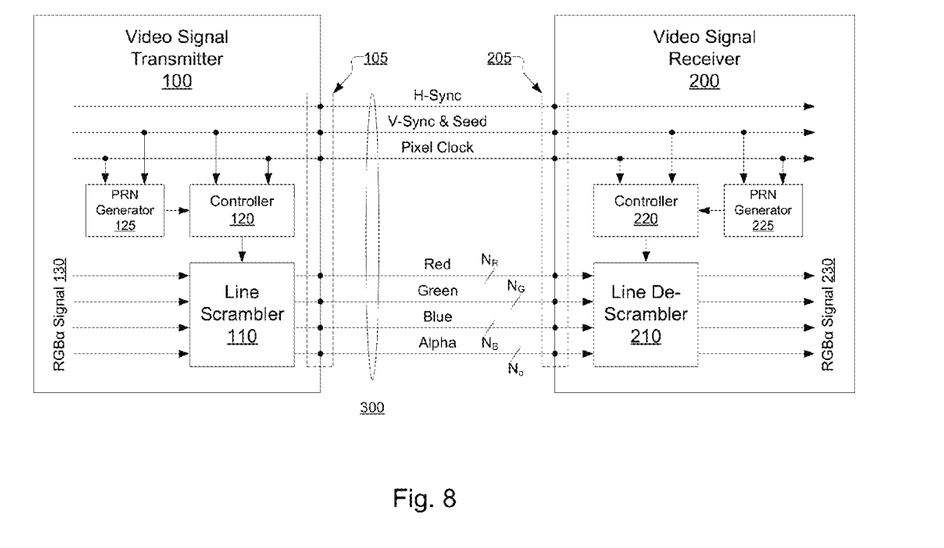
FIG. 8 schematically illustrates a block diagram an image signal transmission system comprising an image data transmitter and an image data receiver according to another example of the present.

Referring now to FIG. 8, a block diagram of a video signal transmitter and a video signal receiver coupled with each other through parallel interfaces according to another example of the present application is schematically illustrated.

On transmitter side, a line scrambler 110 is interposed in signal flow downstream the parallel interface 105 of the video signal transmitter 100. In particular, the line scrambler 110 is directly coupled downstream to the parallel interface 105 of the video signal transmitter 100. On receiver side, a line de-scrambler 210 is interposed in signal flow upstream the parallel interface 205 of the video signal receiver 200. In particular, the line de-scrambler 210 is directly coupled upstream to the parallel interface 205 of the video signal receiver 200. Further, a controller 120 is further arranged with the line scrambler 110 of the video signal transmitter 100 and a controller 220 is arranged with the line de-scrambler 210 of the video signal receiver 200.

The line scrambler 110 is provided to controllably change the assigning or mapping of the bit significances of an N-bit data signal to N data terminals of the transmitter side parallel interface 105. The line de-scrambler 210 is provided to controllably restore the received N-bit data signal at N data terminals of the receiver side parallel to obtain the original N-bit data signal ordered according to the original bit significances.

Further, the video signal transmitter 100 and the video signal receiver 200 each comprises a pseudo random number (PRN) generator 125 pseudo random number (PRN) generator 225, respectively. The pseudo random number (PRN) generators 125 and 225 are initialized with a common seed sequence. The seed sequence may communicated to the pseudo random number (PRN) generators 125 and 225 on the V-Sync signal line as exemplified in FIG. 8, on another signal line or on a separate signal line of the bus 300. The common seed sequence may be preconfigured at the video signal transmitter 100 and the video signal receiver 200 and the pseudo random number (PRN) generators 125 and 225 thereof may be seeded with the preconfigured common seed sequence in response to a synchronization signal such as the H-Sync signal or the V-Sync signal.

The pseudo random number (PRN) generators 125 and 225 are in particular implemented on the basis of a common pseudo random number algorithm. The pseudo random number (PRN) generators 125 and 225 are configured to generate the same sequence of pseudo random numbers when each is seeded with the common seed sequence. The pseudo random number (PRN) generators 125 and 225 generate a pseudo random number in response to a trigger signal provided for instance by the respective controller 120 and 220. The data sampling clock or pixel clock may be supplied to the pseudo random number (PRN) generators 125 and 225 as trigger signal or the trigger signal may be synchronized to the data sampling clock or pixel clock.

The pseudo random number (PRN) generators 125 and 225 are coupled to the respective controllers 120, 220. Each pseudo random number (PRN) generator 125, 225 supplies pseudo random numbers to the respective coupled controller 120, 220.

Based on the pseudo random numbers the controller 120 on transmitter side determines a routing scheme of the line scrambler 110 to obtain a permuted bit sequence of a N-bit data signal, which is supplied to input terminals $i_j$ of the line scrambler 110, at the output terminals $o_j$ thereof, where $j=1, \ldots, N$.

The output terminals $o_j$ of the line scrambler 110 is interconnected through the parallel interface 105, the data signals lines $L_j$ of the bus 300 and the parallel interface 205 to the input terminals $i'_j$ of the line de-scrambler 110.

Based on the pseudo random numbers the controller 220 on the receiver side determine a routing scheme of the line de-scrambler 110 to obtain a reverse permuted or restored bit sequence at the output terminals $o'_j$, where $j=1$, N. The restored bit sequence corresponds the sequence of bits in the N-bit data signal originally supplied to the line scrambler 110.

There is a number of N! different permuted sequences of bit determinable from an N-bit data signal. The pseudo random number (PRN) generators 125 and 225 may be configured to generate integer pseudo random numbers in the range of $[1,N!]$.

Each pseudo random number may be associated with a predetermined permutation $\pi_k$, where $k=1, \ldots, N!$, at the controller 120. The selective routing at the line scrambler 110 is controlled on the basis of the permutation $\pi_k$. The predetermined permutations $\pi_j$ may be provided in a look-up table. The predetermined permutations $\pi_k$ may comprise the control signal 150 for controlling the line scrambler 110 to obtain a selective routing in accordance with a predetermined permutation $\pi_k$.

Each integer pseudo random number may be associated with a predetermined reverse permutation $\pi_k^{-1}$, where $k=1, \ldots, N!$, at the controller 220. The selective routing at the line de-scrambler 210 is controlled on the basis of the reverse permutation $\pi_k^{-1}$. The predetermined revers permutations $\pi_k^{-1}$ may be provided in a look-up table. The predetermined permutations $\pi_k^{-1}$ may comprise the control signal 250 for controlling the line de-scrambler 210 to obtain a selective routing in accordance with a predetermined reverse permutation $\pi_k^{-1}$.

In case a stream of pixel data is transmitted from the video signal transmitter 100 to the video signal receiver 200 over the parallel bus 300, the same permutation $\pi_k$ may be applied to each component data signal of one pixel. The permutation $\pi_k$ may change over time, in particular, the permutation $\pi_k$ may change for each cycle of the pixel clock or data sampling clock. In particular, the pseudo random number (PRN) generators 125 and 225 are controlled to generate new pseudo random number (PRN) for each cycle of the pixel clock or data sampling clock, an signal edge of which may be used to trigger the generation.

Figure 9:
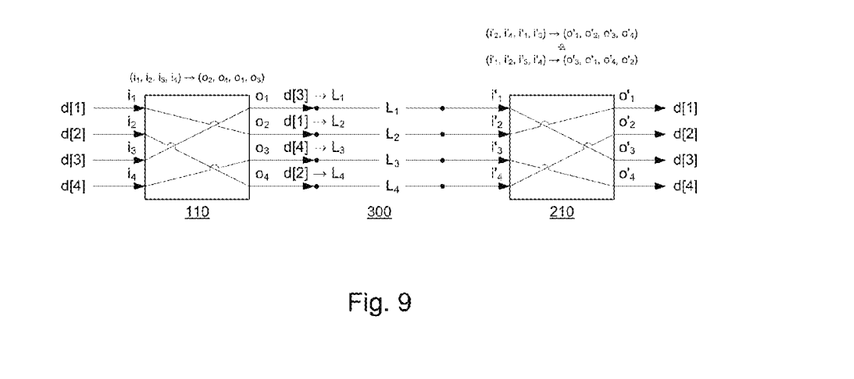
FIG. 9 illustrates a block diagram showing schematically line scrambling and de-scrambling in accordance with the system shown in FIG. 8.

An exemplary selective routing at the line scrambler 110 in accordance with a predetermined permutation $\pi_k$, where $k \in [1,N!]$, and a corresponding selective routing at the line de-scrambler 210 accordance with the corresponding reverse permutation $\pi_k^{-1}$ is schematically illustrated in FIG. 9.

$$(d_1\ d_2\ d_3\ d_4) \rightarrow (i_1\ i_2\ i_3\ i_4)$$

The line scrambler 110 outputs a permuted sequence d' in accordance with the predetermined permutation $\pi_k$ e.g.

$$P_k = P(\pi_k) = \begin{pmatrix} 0 & 1 & 0 & 0 \\ 0 & 0 & 0 & 1 \\ 1 & 0 & 0 & 0 \\ 0 & 0 & 1 & 0 \end{pmatrix}$$

The permuted sequence d' at the output terminals $o_1$ to $o_4$ line scrambler 110 results to:

$$d' = d \cdot P_k$$

$$= (d_1\ d_2\ d_3\ d_4) \cdot \begin{pmatrix} 0 & 1 & 0 & 0 \\ 0 & 0 & 0 & 1 \\ 1 & 0 & 0 & 0 \\ 0 & 0 & 1 & 0 \end{pmatrix}$$

$$= (d_3\ d_1\ d_4\ d_2) \rightarrow (o_1\ o_2\ o_3\ o_4)$$

The permuted sequence d' is transmitted over the bus 300, the data signal lines $L_1$ to $L_4$ of which interconnect the output terminals $o_1$ to $o_4$ of the line scrambler 110 with the respective input terminals $i'_1$ to $i'_4$ of the line de-scrambler 210 via the parallel interfaces 105 and 205. Hence, at the input terminals $i'_1$ to $i'_4$ of the line de-scrambler 210, the permuted sequence d' is received:

$$d' = (d_3\ d_1\ d_4\ d_2) \rightarrow (i'_1\ i'_2\ i'_3\ i'_4)$$

The line de-scrambler 210 restores and outputs the restored original sequence d at the output terminals $o'_1$ to $o'_4$ thereof by the corresponding reserve permutation $\pi_k^{-1}$:

$$d = d' \cdot P_k^T$$

$$= (d_3\ d_1\ d_4\ d_2) \cdot \begin{pmatrix} 0 & 0 & 1 & 0 \\ 1 & 0 & 0 & 0 \\ 0 & 0 & 0 & 1 \\ 0 & 1 & 0 & 0 \end{pmatrix}$$

$$= (d_1\ d_2\ d_3\ d_4) \rightarrow (o'_1\ o'_2\ o'_3\ o'_4)$$

On the basis of the aforementioned description, the skilled person will understand that when each component of a stream of pixel data is transmitted in form of randomly permuted sequences of bit data over a parallel bus with a defective data signal line the displayed image has randomly distributed pixels with false colors. A corresponding random pattern will be perceived by a user as illustrated in depiction (c) of FIG. 10 in case of a defective data signal line of the bus 300 when using pseudo random numbers for controlling the selective data signal routing by the line scrambler 110 corresponding a predefined bit permutation $\pi_k$ of the N-bit signal input to the line scrambler 110.

The components of pixel-wise transmitted image data each comprise a predefined number of bits. The predefined number of bits of each component may differ. As illustrated with reference to FIGS. 2 and 7, the components may comprise RGB coded color components, which comprise $N_R$ bits for the red component, $N_G$ bits for the green component and $N_B$ bits for the blue component, and optionally an alpha component with $N_\alpha$ bits. For the above description, those skilled in the art understand that the data signal of every component may be separately, selectively routed by the line scrambler 110 to obtain permuted bit sequences for each component at the output terminals of the parallel interface 105 on transmitter side and restored bit sequences at the output terminals of the line de-scrambler 210.

In an example of the present application, several, e.g. three, line scramblers 110 and line de-scramblers 210 may be provided at transmitter side and receiver side, respectively, to obtain permuted bit sequences for each color component of pixel-wise transmitted image data.

Alternatively, the components of pixel-wise transmitted image data are considered as one composed bit sequence with e.g. $N=N_R+N_G+N_B\ N_\alpha$) bits. The one composed N-bit signal may be selectively routed by the line scrambler 110 to obtain permuted bit sequences of the one composed N-bit signal at the output terminals of the parallel interface 105 on transmitter side and restored bit sequences at the output terminals of the line de-scrambler 210.

The functionality of the line scrambler 110 and line de-scrambler 210 may be understood as a selective controllable signal routing based on an interchanging, exchanging, swapping, re-assigning, or binding of non-conflicting connections between N input terminals each accepting a data signal, in particular a bi-level data signal, and N output terminals each providing one of the inputted data signals. The function of the line scrambler 110 and line de-scrambler 210 may be performed by a switch, a switching network or a switch arrangement, however the use of the term "switch" does not serve to limit the specific implementation of the function to a discrete device; any mechanism that achieves the interchanging, exchanging, re-assignment, swapping, or binding of the non-conflicting connections may be used. For convenience, the term "switch" when applied to this aspect of the system, apparatus, or method is meant to encompass the range of techniques, which are available to perform the function. Such techniques may also use memory storage locations, operation of a state machine or a stored program computer, and dedicated electronic logic circuits and the like, either alone or in combination.

Those skilled in the art further understand on the basis of the above description that the above described signal interconnect system may be also applied for transmitting an N-symbol data signal from the transmitter to the receiver via the parallel bus. Each of the N data signal lines $L_j$ of the parallel bus is capable of transmitting a signal comprising one data symbol. Hence, the N data symbols of the N-symbol data signal are concurrently transmittable over the parallel bus.

Such a data symbol may code one, two or more data bits. For instance a data symbol coding one data bits may be signalized over a data signal line $L_j$ using a bi-level signal as illustrated in detail above. A data symbol coding two data bits may be signalized over a data signal line $L_j$ using a 4-level signal. More generally, a data symbol coding M data bits may be signalized over a data signal line $L_j$ using a $2^M$-level signal.

The line scrambler 110 is analogously applicable to selectively route the N-symbol data signal, which is input to the N input terminal $i_1$ to $i_4$, to the N output terminals $o_1$ to $o_4$ in accordance with a permutation $\pi_k$ to provide a permuted sequence d' of the N-symbol data signal at the output terminals $o_1$ to $o_4$ thereof.

The line de-scrambler is also analogously applicable selectively route permuted sequence d' of the N-symbol data signal, which is input to the N input terminal $i'_1$ to $i'_4$, to the N output terminals $o'_1$ to $o'_4$ in accordance with the corresponding reverse permutation $\pi_k^{-1}$ to provide the restored N-symbol data signal d at the output terminals $o'_1$ to $o'_4$ thereof.

According to an example of the present application, an interconnect system for transmitting a stream of N-symbol data signals over an error prone wired connection.

The interconnect system comprises a parallel bus 300, a line scrambler 110 and a line de-scrambler 210. The parallel bus 300 has at least N data signal lines Each data signal line $L_j$ is capable of transmitting a signal comprising one data symbol. The line scrambler 110 has N output terminals $o_j$ each for outputting a signal comprising one data symbol. The line de-scrambler 210 has N input terminals $i'_j$ each for accepting a signal comprising one data symbol. Every output terminal $o_j$ of the line scrambler 110 is coupled via one different data signal line $L_j$ to every respective input terminal $i'_j$ of the line de-scrambler 210. The line scrambler 110 is configured to accept an N-symbol data signal d having a sequence of data symbols in a predefined order; and to output a permuted sequence d' of data symbols at the N output terminals $o_j$ of the line scrambler 110 in accordance with a permutation $\pi_k$. The line de-scrambler 210 is configured to accept the permuted sequence d' of data symbols at its input terminal $i'_j$; to restore the predefined order of data symbols from the permuted sequence d' of data symbols in accordance with the corresponding reverse permutation $\pi_k^{-1}$; and to output the restored N-symbol data signal d comprising a sequence of data symbols in the predefined order.

According to an example of the present application, wherein the line scrambler 110 is further configured to selectively route each data symbol to one different output terminal $o_j$ of the line scrambler 110 in accordance with the permutation $\pi_k$.

According to an example of the present application, the line de-scrambler 210 has N output terminals $o'_j$, each of which for outputting a signal comprising one data symbol. The line de-scrambler 210 is further configured to selectively route each data symbol of the permuted sequence d' to one different output terminal $o'_j$ of the line de-scrambler 210 in accordance with the corresponding reverse permutation $\pi_k^{-1}$.

According to an example of the present application, wherein each data symbol comprises one data bit. Alternatively, each data symbol comprises two or more data bits. The signal comprising one data symbol may be a multi-level signal. Each level may represent one of the value of the N data bit symbol.

According to an example of the present application, the parallel bus 300 has further a control signal line capable of transmitting a data sampling signal. The N-symbol data signal is transmitted in synchronicity with the data sampling signal over the parallel bus 300. The data symbol signals of the N-symbol data signal are transmitted as substantially the same time on the data signal lines of the bus 300.

According to an example of the present application, the N-symbol data signal is synchronized on at least one of the edges of the data sampling signal.

According to an example of the present application, the permutation $\pi_k$ is changed over time. According to an example of the present application, the permutation $\pi_k$ is changed for each N-symbol data signal of the stream. According to an example of the present application, the permutation $\pi_k$ is changed in synchronicity with a data sample signal.

According to an example of the present application, the interconnect system further comprises a first pseudo random number generator 125, which is configured to generate first pseudo random numbers PRN. The permutation $\pi_k$ is a function of a generated first pseudo random number PRN.

According to an example of the present application, the interconnect system further comprises a second pseudo random number generator 225, which is configured to generate second pseudo random numbers PRN. The corresponding reverse permutation $\pi_k^{-1}$ is a function of a generated second pseudo random number PRN.

According to an example of the present application, the first pseudo random number generator 125 and the second pseudo random number generator 225 are initialized by a common seed sequence.

According to an example of the present application, the parallel bus 300 is a detachable connection.

According to an example of the present application, the N-symbol data signal comprises at least one N-symbol component of a pixel of image data. According to an example of the present application, the N-symbol data signal comprises a subset of symbols of an N-symbol component of a pixel of image data. The components may be color components according to a color coding scheme. The components may further comprise an alpha component e.g. for defining a transparency value of the pixel.

According to an example of the present application, the interconnect system further comprises a video signal transmitter 100, which includes the line scrambler 110; and a video signal receiver 200, which includes the line descrambler 210. The video signal transmitter 100 and the video signal receiver 200 are coupled to each other via the parallel bus 300. The stream of N-symbol data signals is a stream of pixel data signals each comprising at least one component. The number N of data signal lines $L_j$ is at least equal to the total number of data symbols used for coding the at least one component.

According to an example of the present application, the interconnect system further comprises a first parallel interface 105 arranged with the video signal transmitter 100 and directly coupled to the line scrambler 110; and a second parallel interface 205 arranged with the video signal receiver 200 and directly coupled to the line de-scrambler 210. The parallel bus 300 is detachably coupled to the first and second parallel interface 105, 205.

According to an example of the present application, the line scrambler 110 is further configured to output a permuted sequence d' of data symbols for each component of a pixel data signal.

According to an example of the present application, a video signal transmitter for transmitting a stream of image data signals over an error prone wired connection to a video signal receiver 200 is provided. The video signal transmitter 100 comprises a parallel interface 105 and a line scrambler 110.

The parallel interface 105 comprises at least N data terminals $o_j$. The line scrambler 110 has N output terminals $o_j$, each of which for outputting a signal comprising one data symbol. The parallel interface 105 is provided for being coupled to a parallel bus 300 having at least N data signal lines $L_j$. Each data signal line $L_j$ is capable of transmitting a signal comprising one data symbol. Every output terminal $o_j$ of the line scrambler 110 is fixedly coupled to one different data terminals $o_j$ of the parallel interface 105.

The line scrambler 110 is configured to accept at least a component signal of a pixel of the image data. The component signal comprises an N-symbol data signal d having a sequence of N data symbols in a predefined order to output a permuted sequence d' of data symbols at the N output terminals $o_j$ of the line scrambler 110 in accordance with a permutation $\pi_k$.

According to an example of the present application, the line scrambler 110 is further configured to selectively route each data symbol to a different one of the at least N output terminals $o_j$ of the line scrambler 110 in accordance with the permutation $\pi_k$.

According to an example of the present application, the video signal transmitter further comprises a pseudo random number generator 125, which is configured to generate pseudo random numbers PRN. The permutation $\pi_k$ is a function of a generated pseudo random number PRN.

According to an example of the present application, a video signal receiver for receiving a stream of image data signals over an error prone wired connection from a video signal transmitter 100 is provided.

The video signal receiver 200 comprises a parallel interface 205 and a line de-scrambler 210. The parallel interface 205 comprises at least N data terminals $i'_j$. The line de-scrambler 210 has N input terminals $i'_j$, each of which for accepting a signal comprising one data symbol. The parallel interface 205 is provided for being coupled to a parallel bus 300 having at least N data signal lines $L_j$. Each data signal line $L_j$ is capable of transmitting a signal comprising one data symbol. Every input terminal $i'_j$ of the line de-scrambler 210 is fixedly coupled to one different data terminals $i'_j$ of the parallel interface 205.

The line de-scrambler 210 is configured to accept the permuted sequence d' of data symbols at its input terminal $i'_j$; to restore a predefined order of data symbols from the permuted sequence d' of data symbols in accordance with a corresponding reverse permutation $\pi_k^{-1}$; and to output the restored N-symbol data signal d comprising the sequence of data symbols in the original predefined order. The restored N-symbol data signal d comprises at least a component signal of a pixel of the image data.

According to an example of the present application, the permuted sequence d' of data symbols is representable by a permutation $\pi_k$ applied to a sequence of data symbols in predefined order comprised by the N-symbol data signal d.

According to an example of the present application, the video signal receiver further comprises a pseudo random number generator 225, which is configured to generate pseudo random numbers PRN. The corresponding reverse permutation $\pi_k^{-1}$ is a function of a generated pseudo random number PRN.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An interconnect system for transmitting a stream of N-symbol data signals over an error prone wired connection, the system comprising:
   a parallel bus having at least N data signal lines, each capable of transmitting a signal comprising one data symbol;
   a line scrambler having N output terminals, each capable of outputting a signal comprising one data symbol; and
   a line de-scrambler having N input terminals, each capable of accepting a signal comprising one data symbol;
   wherein every output terminal of the line scrambler is coupled via a different data signal line to every respective input terminal of the line de-scrambler,
     wherein the line scrambler is configured
       to accept an N-symbol data signal having a sequence of data symbols in a predefined order; and
       to output a permuted sequence of data symbols at the N output terminals of the line scrambler in accordance with a permutation,
     wherein the line de-scrambler is configured
       to accept the permuted sequence of data symbols at its input terminal;
       to restore the predefined order of data symbols from the permuted sequence of data symbols in accordance with the corresponding reverse permutation; and
       to output the restored N-symbol data signal comprising a sequence of data symbols in the predefined order.

2. The system according to claim 1,
   wherein the line scrambler is further configured
     to selectively route every data symbol to one different output terminal of the line scrambler in accordance with the permutation.

3. The system according to claim 1,
   wherein the line de-scrambler has N output terminals each capable of outputting a signal comprising one data symbol;
   wherein the line de-scrambler is further configured
     to selectively route each data symbol of the permuted sequence to one different output terminal of the line de-scrambler in accordance with the corresponding reverse permutation.

4. The system according to claim 1,
   wherein the parallel bus has further a control signal line capable of transmitting a data sampling signal,
   wherein the N-symbol data signal is transmitted in synchronicity with the data sampling signal over the parallel bus.

5. The system according to claim 4,
wherein the N-symbol data signal is synchronized on at least one of the edges of the data sampling signal.

6. The system according to claim 1,
wherein the permutation is changed for each N-symbol data signal of the stream.

7. The system according to claim 1, further comprising:
a first pseudo random number generator configured to generate first pseudo random numbers;
wherein the permutation is a function of a generated first pseudo random number.

8. The system according to claim 7, further comprising:
a second pseudo random number generator configured to generate second pseudo random numbers;
wherein the corresponding reverse permutation is a function of a generated second pseudo random number.

9. The system according to claim 8, further comprising:
wherein the first pseudo random number generator and the second pseudo random number generator are synchronized by a common seed sequence.

10. The system according to claim 1,
wherein the N-symbol data signal comprises at least one N-symbol component signal of a pixel of image data.

11. The system according to claim 1,
wherein the N-symbol data signal comprises a subset of symbols of an N-symbol component signal of a pixel of image data.

12. The system according to claim 11, further comprising:
a first parallel interface arranged with the video signal transmitter and directly coupled to the line scrambler; and
a second parallel interface arranged with the video signal receiver and directly coupled to the line de-scrambler;
wherein the parallel bus is detachably coupled to the first and second parallel interface.

13. The system according to claim 11,
wherein the line scrambler is further configured
to output a permuted sequence of data symbols for each component signal of a pixel data signal.

14. The system according to claim 1, further comprising:
a video signal transmitter including the line scrambler; and
a video signal receiver including the line de-scrambler;
wherein the video signal transmitter and the video signal receiver are coupled via the parallel bus;
wherein the stream of N-symbol data signals is a stream of pixel data signals each comprising at least one component signal.

15. A video signal transmitter for transmitting a stream of image data signals over an error prone wired connection to a video signal receiver,
the video signal transmitter comprising:
a parallel interface comprising at least N data terminals; and
a line scrambler having N output terminals, each capable of outputting a signal comprising one data symbol,
wherein the parallel interface is provided for being coupled to a parallel bus having at least N data signal lines, each data signal line capable of transmitting a signal comprising one data symbol,
wherein every output terminal of the line scrambler is fixedly coupled to one different data terminals of the parallel interface,
wherein the line scrambler is configured
to accept at least a component signal of a pixel of the image data, wherein the component signal comprises an N-symbol data signal having a sequence of N data symbols in a predefined order; and
to output a permuted sequence of data symbols at the N output terminals of the line scrambler in accordance with a permutation.

16. The video signal transmitter according to claim 15,
wherein the line scrambler is further configured
to selectively route each data symbol to a different one of the at least N output terminals of the line scrambler in accordance with the permutation.

17. The video signal transmitter according to claim 15, further comprising:
a pseudo random number generator configured to generate pseudo random numbers;
wherein the permutation is a function of a generated pseudo random number.

18. A video signal receiver for receiving a stream of image data signals over an error prone wired connection to a video signal transmitter,
the video signal receiver comprising:
a parallel interface comprising at least N data terminals; and
a line de-scrambler having N input terminals each for accepting a signal comprising one data symbol;
wherein the parallel interface is provided for being coupled to a parallel bus having at least N data signal lines, each data signal line capable of transmitting a signal comprising one data symbol,
wherein every input terminal of the line de-scrambler is fixedly coupled to one different data terminals of the parallel interface,
wherein the line de-scrambler is configured
to accept the permuted sequence of data symbols at its input terminal;
to restore a predefined order of data symbols from the permuted sequence of data symbols in accordance with a corresponding reverse permutation; and
to output the restored N-symbol data signal comprising the sequence of data symbols in the predefined order,
wherein the restored N-symbol data signal comprises at least a component signal of a pixel of the image data.

19. The video signal receiver according to claim 18,
wherein the permuted sequence of data symbols is representable by a permutation applied to a sequence of data symbols in predefined order comprised by the N-symbol data signal.

20. The video signal receiver according to claim 18, further comprising:
a pseudo random number generator configured to generate pseudo random numbers;
wherein the corresponding reverse permutation is a function of a generated pseudo random number.

* * * * *